Patented June 22, 1954

2,681,939

UNITED STATES PATENT OFFICE 2,681,939

PRODUCTION OF CHLOROMETHYL METHYL ETHER

William C. Bauman and Elmer L. McMaster, Midland, Mich., assignors to The Dow Chemical Company, Midland, Mich., a corporation of Delaware No Drawing. Application June 7, 1950, Serial No. 166,759

6 Claims. (Cl. 260—614)

This invention concerns a new method of making chloromethyl methyl ether. It relates more particularly to the production of chloromethyl methyl ether by reaction of hydrogen chloride with a mixture of formaldehyde and methylal.

It is known to prepare choloromethyl methyl ether by passing hydrogen chloride into an aqueous solution of formaldehyde and methyl alcohol until the solution is saturated with the hydrogen chloride and thereafter separating the aqueous and the organic layers of the reaction mixture. The method heretofore proposed for the production of chloromethyl methyl ether has not been entirely satisfactory for production of the compound on a commercial scale, particularly with regard to the yield of the chloromethyl methyl ether obtained.

We have now discovered that chloromethyl methyl ether can readily be obtained in good yield by introducing hydrogen chloride into a mixture containing as the essential reactants methylal and formaldehyde, the latter being preferably in the form of an aqueous solution, until the mixture is substantially saturated with respect to the hydrogen chloride, or until absorption of hydrogen chloride by the mixture is completed, and thereafter separating the aqueous and the organic layers of the reaction mixture. The reaction may be carried out batchwise or in continuous manner to obtain chloromethyl methyl ether of high purity, i. e. of 95 per cent purity or higher. The product is suitable for many purposes without need of further purification, e. g. it may be used for the chloromethylation of aromatic compounds such as benzene or toluene. If desired, the chloromethyl methyl ether may be further purified in usual ways, e. g. by distillation.

The formaldehyde is preferably employed in the form of an aqueous solution containing from 27 to 40 per cent by weight or more of the formaldehyde, although formaldehyde in solid form, such as paraformaldehyde, metaformaldehyde, trioxymethylene, polyoxymethylene, or alphatrioxymethylene may also be used.

The formaldehyde in the form of an aqueous solution, or in solid form, e. g. as paraformaldehyde, and the methylal are usually employed in stoichiometric or substantially stoichiometric proportions, i. e. in amounts corresponding to approximately molecular equivalent proportions of the formaldehyde and the methylal. Methylal is preferably employed in the reaction, but mixtures of methylal and methyl alcohol may also be used.

The hydrogen chloride is employed in amount sufficient to saturate the mixture. It reacts with the formaldehyde and the methylal to form chloromethyl methyl ether. The hydrogen chloride is usually added to the mixture until the mixture is saturated with respect to the hydrogen chloride. The hydrogen chloride is advantageously added to the mixture of formaldehyde and methylal as rapidly as the exothermic heat of reaction can be removed in any usual manner, e. g. by external cooling. For a given reactor, it has beein observed that the chloromethyl methyl ether product is obtained in better yield and of higher purity when the hydrogen chloride is rapidly introduced into the mixture of formaldehyde and methylal until the mixture is saturated with respect thereto, than when the hydrogen chloride is added more slowly over a longer period of time.

The reaction which occurs readily at temperatures between 0° and 60° C. is preferably carried out at temperatures of from 10° to 50° C. and at atmospheric or substantially atmospheric pressure, although somewhat higher pressures such as a pressure of from 5 to 20 pounds per square inch, gauge, may be used.

The reaction may be carried out batchwise or in continuous manner and in the presence or absence of calcium chloride. In this connection it may be mentioned that the reaction may advantageously be carried out in admixture with calcium chloride in amount sufficient to form a saturated, or a nearly saturated, aqueous solution with the water which is formed in the reaction according to the equation:

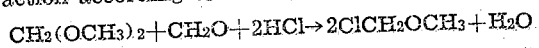
$$CH_2(OCH_3)_2 + CH_2O + 2HCl \rightarrow 2ClCH_2OCH_3 + H_2O$$

when formaldehyde in solid form, e. g. paraformaldehyde, is employed in the reaction. When the formaldehyde is employed in the form of an aqueous solution, excellent results are obtained by adding sufficient calcium chloride to the mixture of the methylal and the aqueous formaldehyde solution to form a mixture in which the aqueous phase is saturated, or nearly saturated, with respect to the calcium chloride, prior to introducing hydrogen chloride into the mixture. In general, an amount of the calcium chloride corresponding to from 0.5 to 1 part by weight per part of water in the reaction mixture is satisfactory.

In practice, the methylal and the formaldehyde, preferably in the form of an aqueous solution, are placed in a suitable reaction vessel, in the desired proportions, together with calcium chloride in amount sufficient to form a nearly saturated solution of the aqueous phase. The mixture is stirred and maintained at a reaction temperature between 0° and 60° C., preferably between 10° and 50° C., while rapidly introducing hydrogen chloride into the mixture until the mixture is saturated, or substantially saturated, with respect to the hydrogen chloride. Thereafter, the aqueous and the organic layers of the reaction mixture are separated. The chloromethyl methyl ether, which is obtained as the organic layer, is usually of 95 per cent purity or higher. If desired, it may be further purified in usual ways, e. g., by distillation.

The following examples illustrate ways in which the principle of the invention has been applied, but are not to be construed as limiting the invention.

*Example 1*

A mixture consisting of 76 grams (1 mole) of methylal and 83 grams of an aqueous solution containing 36 per cent by weight of formaldehyde, was placed in a glass reaction flask equipped with a gas inlet, a reflux condenser and a stirrer. The mixture was stirred and cooled to a temperature of 10° C. A stream of hydrogen chloride was rapidly introduced into the mixture over a period of 30 minutes while maintaining the mixture at a temperature of 10° C. Approximately 132 grams of hydrogen chloride was absorbed in the mixture. Thereafter, the aqueous and the organic layers of the reaction mixture were separated. There was obtained 138 grams of organic liquid having a specific gravity of 1.070 at 25° C. It was substantially pure chloromethyl methyl ether. The yield was 85.7 per cent of theory.

*Example 2*

The experiment of Example 1 was repeated, except that 50 grams of calcium chloride containing about 20 per cent by weight of water of crystallization, was added to the mixture of the methylal and the aqueous formaldehyde solution prior to introducing the hydrogen chloride into the mixture. Approximately 125 grams of hydrogen chloride was absorbed in the mixture. There was obtained 145 grams of organic liquid having a specific gravity of 1.073 at 25° C. It was nearly pure chloromethyl methyl ether. The yield was 90 per cent of theory.

*Example 3*

A solution consisting of 152 grams (2 moles) of methylal and 167 grams of an aqueous solution containing 36 per cent by weight of formaldehyde, was placed in a reaction vessel equipped with a gas inlet, a reflux condenser and a stirrer. The solution was stirred and 138 grams of granular calcium chloride containing 20 per cent by weight of water of crystallization, was added thereto. Hydrogen chloride was then rapidly introduced into the mixture over a period of 30 minutes, while maintaining the mixture at a temperature between 40° and 50° C. Approximately 183 grams of hydrogen chloride was absorbed in the reaction mixture. Thereafter, the aqueous and the organic layers of the reaction mixture were separated. There was obtained 300 grams of organic liquid having a specific gravity of 1.074 at 25° C. It was substantially pure chloromethyl methyl ether. The yield was 93 per cent of theory.

*Example 4*

A mixture consisting of 76 grams (1 mole) of methylal and 30 grams of paraformaldehyde was placed in a glass reaction flask equipped with a gas inlet, a reflux condenser and a stirrer. The mixture was stirred. A stream of hydrogen chloride was rapidly introduced into the mixture at a temperature of 10° C. over a period of 30 minutes. Approximately, 94 grams of hydrogen chloride were absorbed in the mixture. The organic layer and the aqueous layers of the reaction mixture were separated. There was obtained 151 grams of organic liquid having a specific gravity of 1.075 at 25° C. It was substantially pure chloromethyl methyl ether. The yield was 94 per cent of theory.

Other modes of applying the principle of the invention may be employed instead of those explained, change being made as regards the steps or compounds herein employed, provided the steps or compounds stated in any of the following claims, or the equivalent of such steps or compounds be employed.

We claim:

1. A method of making chloromethyl methyl ether which comprises, introducing hydrogen chloride into a mixture containing as the essential components approximately molecular equivalent proportions of formaldehyde and methylal, at a reaction temperature between 0° and 60° C. until the mixture is substantially saturated with respect to the hydrogen chloride and thereafter separating the aqueous and the organic layers of the reaction mixture.

2. A method of making chloromethyl methyl ether which comprises, introducing hydrogen chloride into a mixture consisting of approximately molecular equivalent proportions of formaldehyde and methylal maintained at a reaction temperature between 0° and 60° C. until the mixture is substantially saturated with respect to the hydrogen chloride and thereafter separating the aqueous and the organic layers of the reaction mixture.

3. A method of making chloromethyl methyl ether which comprises, introducing hydrogen chloride into a mixture consisting of approximately molecular equivalent proportions of formaldehyde and methylal in admixture with calcium chloride in amount corresponding to from 0.5 to 1 part by weight of the calcium chloride per part of water to be present upon completion of the reaction, said mixture being maintained at a reaction temperature between 0° and 60° C., until the mixture is substantially saturated with respect to the hydrogen chloride and thereafter separating the aqueous and the organic layers of the reaction mixture.

4. A method of making chloromethyl methyl ether which comprises, introducing hydrogen chloride into a mixture consisting of approximately equimolecular proportions of methylal and formaldehyde, the latter being in the form of an aqueous solution containing at least 27 per cent by weight of the formaldehyde, while maintaining said mixture at a reaction temperature between 0° and 60° C. until the mixture is substantially saturated with respect to the hydrogen chloride and thereafter separating the aqueous and the organic layers of the reaction mixture.

5. A method of making chloromethyl methyl ether which comprises, introducing hydrogen chloride into a mixture consisting of approximately equimolecular projections of methylal and formaldehyde in admixture with a nearly saturated aqueous solution of calcium chloride, said mixture being maintained at a reaction temperature between 0° and 60° C., until the mixture is substantially saturated with respect to the hydrogen chloride and thereafter separating the aqueous and the organic layers of the reaction mixture.

6. A method of making chloromethyl methyl ether which comprises, adding to a mixture consisting of equimolecular proportions of methylal and formaldehyde, the latter being in the form of an aqueous solution containing from 27 to 40 per cent by weight of the formaldehyde, calcium chloride in amount corresponding to from 0.5 to 1 part by weight of the calcium chloride per part of water in the mixture, introducing hydrogen chloride into the mixture while maintaining said mixture at a reaction temperature between 0° and 60° C. until the mixture is substantially saturated with respect to the hydrogen chloride and thereafter separating the aqueous and the organic layers of the reaction mixture.

References Cited in the file of this patent

UNITED STATES PATENTS

| Number | Name | Date |
| --- | --- | --- |
| 1,660,756 | Lichtenthaeler | Feb. 28, 1928 |
| 1,695,449 | Bannister | Dec. 18, 1928 |
| 2,304,431 | Walker (II) | Dec. 8, 1942 |
| 2,370,540 | Hodge | Feb. 27, 1945 |
| 2,532,044 | Walker et al (III) | Nov. 28, 1950 |

OTHER REFERENCES

Cumming et al., Systematic Organic Chemistry, D. Van Nostrand Company, New York (1925), page 215.

Walker (I), "Formaldehyde," Reinhold Publishing Company, New York (1944), pages 138–139 and 144–145.